United States Patent [19]

Hines

[11] 4,147,185

[45] Apr. 3, 1979

[54] FLEXIBLE TUBULAR DEVICE

[76] Inventor: Vernon C. Hines, c/o Thermotec Corp., 1001 Tejon St., Denver, Colo. 80204

[21] Appl. No.: 890,455

[22] Filed: Mar. 27, 1978

Related U.S. Application Data

[63] Continuation of Ser. No. 748,777, Dec. 8, 1976, abandoned.

[51] Int. Cl.² ............................................. F16L 11/14
[52] U.S. Cl. ................................... 138/121; 138/139; 138/143
[58] Field of Search ............... 138/121, 123, 137, 139, 138/143, 173, 177, 178, 26

[56] References Cited

U.S. PATENT DOCUMENTS 2,371,991   3/1945   Harding ........................... 138/173 X
2,657,364   10/1953  Carr ................................. 138/139 X

*Primary Examiner*—Richard E. Aegerter
*Assistant Examiner*—Frederick R. Schmidt

[57] ABSTRACT

A metal, convoluted tube with integral, extending end connectors, with the inwardly extending convolutes of the tube exterior filled with and bonded to a non-porous elastomer, and the elastomer extends a substantial distance onto the extending end connectors and outwardly beyond the metal convolutes.

7 Claims, 3 Drawing Figures

FLEXIBLE TUBULAR DEVICE

This application is a continuation of my patent application Ser. No. 748,777, filed Dec. 8, 1976, now abandoned.

This invention relates to improved flexible tubes or metal bellows, which have extending end connectors and having the exterior of the metal bellows and a major portion of the connectors completely covered with a non-porous elastomer.

BACKGROUND OF THE INVENTION

Metal bellows, or flexible metal convoluted tubing, has provided a conventional means of connecting piping systems usually one of which tends to be a stationary system to other systems which are subjected to various types of movement. Particularly, the metal bellows have found considerable use in piping sytems utilizing a or other equipment which can transfer vibratory and other movements to a piping system. Piping systems, subject to substantial temperature differences, systems subject to pressure differences and systems which require sound deading connectors have utilized flexible connectors. A metal bellows, which is subjected to a torsional loading, usually has premature ring-like failure around one or more of the metal convolutes. This premature failure is directly related to the torsional loading, the loci stresses, and thus is an inherent disadvantage of flexible metal bellows. Repetitive torsional loading will initiate a much earlier failure in such bellows. The stress centers from this torsional loading are located generally through a combination of geometrical considerations, thickness of metal, resident stress, and other minor unconformities which when added to the motion and resonance centers, collectively, make individual identification and prediction of stress location uneconomical, if possible at all. The lack of axial alignment in many cases causes metal bellows to sustain early failure because of the concentration of stresses in the areas of convergence and divergence of the bellows undergoing flexing.

A characteristic of metal bellows seems to be that the thinner the web or metal of the bellows, the greater the flexibility and longer life during flexure. However, as a corollary of this, as the metal is made thinner the greater the vulnerability to crushing of the inner convolute from increased pressures, and of course, subsequent early failures.

PRESENT INVENTION

The present invention has found means to overcome some of the inherent difficultties of conventional flexible metal type bellows which will provide important new uses as well as better utility for many of older applications of flexible pipes. It has been found that by applying and bonding a non-porous elastomer to the exterior of the metal bellows and extending the elastomer a substantial distance over the rigid connectors a highly superior device is provided.

OBJECT OF THE INVENTION

It is, therefore, among the objects and advantages of the invention to provide a convoluted metal hose or bellows device having an elastomeric body bonded to the exterior thereof including a substantial portion of the attached rigid connectors of the bellows.

It is another object of the invention to provide an elastomeric covered convoluted metal hose device which is very flexible, having thin metal walls yet capable of carrying excessive pressure without failure.

Still another object of the invention is to provide a convoluted metal hose with its exterior completely covered and bonded to a non-porous elastomeric material which extends to and over the attached rigid connectors thereof, which provides a metal bellows capable of a substantial longer life without failure on flexure including torsional loads, misalignment of connections, and providing unusually high crushed strength from hydrostatic exterior forces, etc.

Yet another object of the invention is to provide a convoluted metal tubular device or bellows covered by and bonded to an elastomeric cover whereby under nominal pressures any rupture to the metal bellows the internal fluid can be retained pending replacement of the bellows.

These and other objects and advantages of the invention may be readily ascertained by referring to the following description and appended illustrations in which.

SPECIFIC EMBODIMENTS OF THE INVENTION

A flexible metal bellows may be welded, soldered or otherwise secured to the rigid connection sections of pipe, tube, connectors, joints or the like, which are used to connect the bellows into piping systems. The exterior surfaces of the metal of the bellows and of the metal connecting sections are first chemically cleaned, and then the necessary bonding agents are applied. In one method, the inner or depressed portions of the exterior of convolutes of the metal bellows are filled with a non-porous elastomer, with any air between the two being purged so that the elastomer placed in the convolutes is in intimate bonding contact with the metal. This filling may be accomplished by hand, with machine rollers, or extruders, applying the unvulcanized elastomer to the metal. A next layer of elastomeric material, of a thickness to give the desired overall thickness extending beyond the outer convolutes of the bellows, is then placed in contact with the first layer of elastomer. The outside layer of elastomeric material is extended at full diameter over and a substantial distance along and in bonding contact with the non-convoluted connecting sections. The extension of the elastomeric material onto the rigid pipe connectors may satisfactorily be of a length equivalent to the length of from two to ten convolutes of the convoluted section. A usually satisfactory length is equivalent to the length of four of the convolutions. When thus prepared the entire assembly may be placed in a pressure mold or mandrel, or wrapped with suitable tape and heated to a sufficient temperature for curing, vulcanizing, and bonding the elastomer to the metal and to itself.

Figure 1:
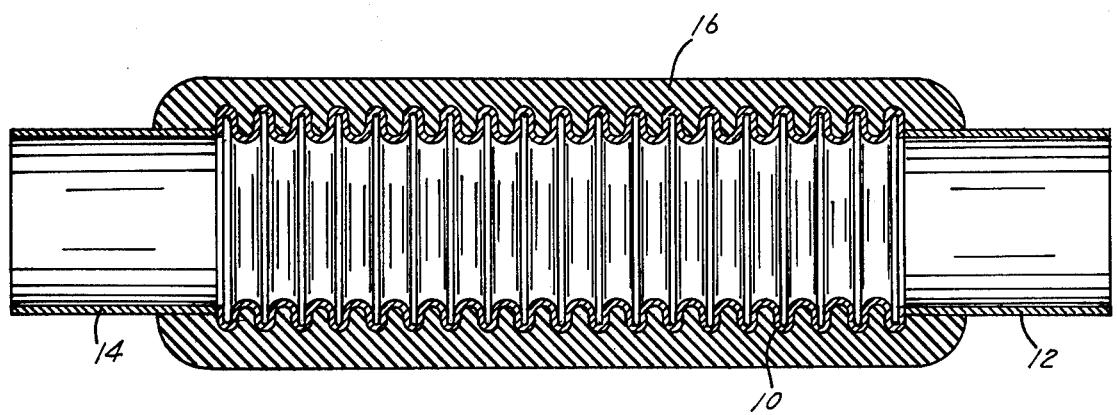
FIG. 1 is a cross sectional side elevational view of a flexible metal bellows system according to the invention, illustrating the positioning of the metal bellows with attached extending rigid connectors ends and a bonded elastomeric coating.

In the device selected for illustration in FIG. 1, a metal bellows 10 (made of such metals as bronze, copper, stainless steel, and similar metals) may be made of any length and diameter as desired. The convolutes may be made spiral or individual with any width, depth and pitch desired, as necessary for a particular system design. Welded, braised, soldered or otherwise secured to the right end of the bellows is an end connector 12, and in a similar manner an end connectors 14 is secured to the opposite end of the bellows. In this case, the ends are tubular, but may include any connector desired, i.e. threaded, flanged, etc. The exterior of the bellows is completely covered with and bonded to an elastomeric material 16 (which extends over the live length of the bellows) and is labelled as "cover length". The "assembly length" of the unit is shown as extending from end to end of the connectors. In this case, the cover extends beyond the flexible bellows at least three convolute lengths onto each end fitting. The cover may be attached as provided above. In an alternative method, the convoluted section may be somewhat extended or stretched before the addition of the elastomeric material and maintained extended and stretched through the vulcanizing and bonding. When so prepared and the convoluted section is relaxed, after the vulcanizing and bonding, the relaxed inner convolutes are in a prestressed state of compression on the elastomeric material filling the voids between the convolute.

Among the possible covering material for the metal bellows, silicone rubber is a material choice, however, other materials may be found satisfactory for some purposes. The elastomeric material include such materials as natural and synthetic rubber, butyl rubber, neoprene, polyurethanes, vinyl polymers and copolymers, polyfluoro carbons, and the like.

It is important to consider the effect of the bonded elastomeric material, which is bonded to and fills the convolutes and extends onto the end fittings of the bellows. Each segment of the filled convolutes gives an evenly loaded, near circular cross section, with a small connecting section to the outer sheath of elastomeric material. Any loading on the metal of the inner convolute portions is transmitted by way of the filling elastomeric material equally to all portions of the cross section of the metal. This prevents collapse of the metal due to high pressure, which may be high enough to collapse the bellows without the filling. The elastomeric material bonded to the outer surface of the outer convolutes, also, distributes load in axial, torsional, or longitudinal flexure, or combination of all. The elastomeric material sheathing the convolutes, however, provides a ring strength substantially greater than the filling of the inner portions of the convolutes. It is to be recognized that about one-half of the thickness of the metal of a convolute will be in tension while the opposite end is in compression, the thinner the metal the less the moment of either component. This moment decreases as the metal thickness is decreased until it is negligible in very thin metal. The very thin metal, therefore, gives great flexibility with minimum of fatigue from internal stresses. The elastomeric material filling the convolutes, in addition to preventing to collapse of the inner convolutes provides a compressive load as the inner convolute is squeezed in bending. This in turn forces the squeezing load to be applied to the other adjoining convolutes, which behave in a similar manner, distributing the load equally and providing a minimum bending to each. The elastomeric compressive forces causes the individual convolute to bend more substantially in tension (cross section) to further minimize shear fatigue sources.

It is recognized that rubber has been made into all types of hoses and tubing, and in some instances may have been put around the convolutes of flexible metal convoluted pipe. In the present case, however, the elastomeric material is bonded to the complete exterior surface of all the convolutes, and is integral with the outer covering portion of elastomeric material, which may be considered a scuff member. The elastomeric material is, also, bonded on and in a stationary manner to each end connecting pipe. These end connecting pipes or connectors are stationary with respect to the motions of the convolutes and the total combination provides a competent member for stress distribution from any one convolute to all the others in a proportionate manner. The combinations with the bonding of the elastomeric material to the exterior surfaces of the convolutes measurably reduces the problem of torsional fatigue to the metal convoluted tubing.

Figure 2:
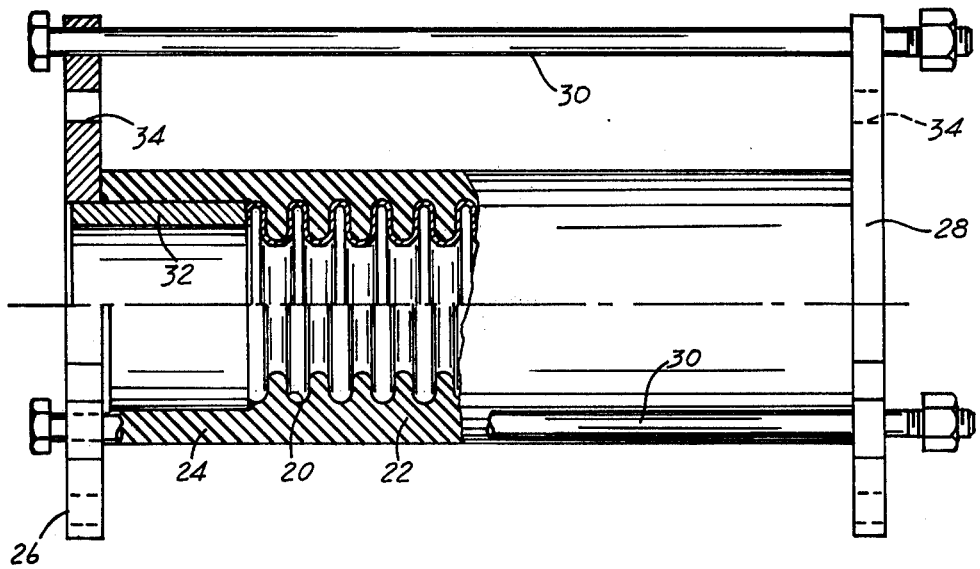
FIG. 2 is a side elevational view of a covered metal bellows, according to the invention, adapted to a flanged expansion joint for connection to piping systems.

According to the device of FIG. 2, the invention is applied to a flanged expansion joint, wherein a metal convoluted pipe 20 is covered with an elastomeric material 22 which is bonded to all of the exterior surface of the convoluted pipe and covers the end connectors 24 to the flange 26. In a similar manner the elastomeric material extends to and is bonded with the right flange 28 as well as the connector. The flanges are maintained within a predetermined limit of motion by lost motion bolts 30 spaced around the exterior portions of the flanges, permitting the flanges to move between the bolt heads and the nuts attached to the opposite end. The convoluted bellows 20 is welded, soldered, or otherwise attached to a rigid pipe end connector 32, it being understood that both ends of the convoluted material is, likewise, secured to a rigid pipe end connector. The left end flange 26 is welded or otherwise secured to the connector 32. The elastomeric material 22 is similarily bonded to the exterior of the rigid pipe connectors 32 and to the flange providing a generally integral unit. In one form, the flanges are slightly larger than a normal connecting flange, and bores 34 inset form the lost motion bolts are arranged to mate with the bolt holes of normal connecting flanges of the piping system to which the unit is attached. Also, ears may be provided for the lost motion bolt holes. The connection length of the unit is indicated as from face to face of the flange, while the live length of the convolute is indicated at the connection of the convolute to the rigid end connectors.

The flanged connector is made in the manner of the device of FIG. 1, in that the elastomeric material is forced into the convolutes which have been cleaned and bonding material placed on all exterior surfaces of the convolutes. The exterior or cover elastomeric material is then placed over the elastomeric material in the convolutes and over the end pipes, and the whole is vulcanized to provide an integral unit with the elastomeric material bonded to the metal parts.

Figure 3:
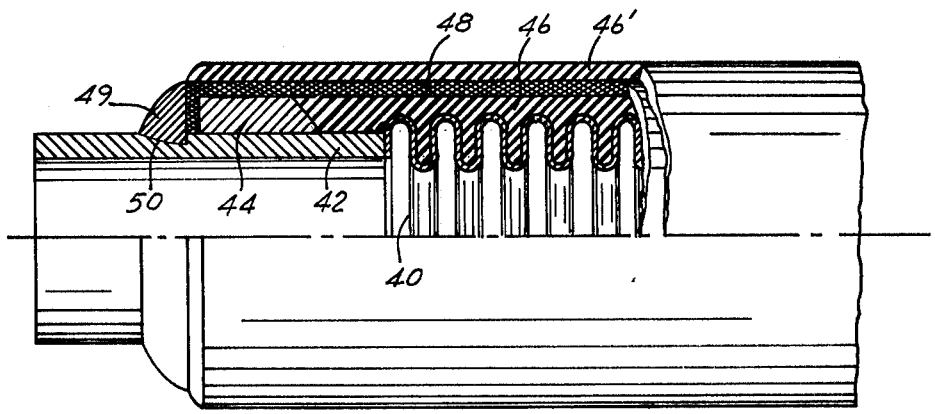
FIG. 3 is a side elevational view of one end, partially cut away, of a covered metal bellows according to the invention with a further reinforcing of wire braide embedded in the elastomeric covering of the bellows.

Further reinforcing of a connector may be accomplished by the use of braided wire, shown in FIG. 3, for example. In this case, the metal convoluted pipe 40 is welded to both end connectors 42 in conventional manner (only one is shown). On the connector 42 is mounted a ring or band 44 which is welded to the rigid connector 42 in a position spaced from the flexible convoluted pipe 40. Elastomeric material 46 is then forced into the convolutes of the convoluted tube 40, the surface of which has been previously cleaned and bonding materials added. A covering of elastomeric material extends beyond the convolutes onto the end 42 and against the inner radial surface or ring 44. A braided wire cover 48 is then placed over the elastomeric material 46. This braid may be welded, soldered or otherwise secured to the ring 44 providing a secure anchor for the wire braid. The exterior end of the braid may then be bent downwardly around the outer end of the band 44, and a block 49 may be secured in a groove 50 against the braid ends 48 over the outer end of the band 44, to provide a doubly secured anchor for the braid. Additionally, the elastomeric material 46' is placed over the metal braid, providing a scuff protector for the flexible connector unit. With the layers of elastomeric material in place, the unit may then be vulcanized to provide an integral elastomeric material around and bonded to the metal bellows. This hose is, therefore, further reinforced by the metal braid 48, which is securely anchored endwise to both of the connectors. It is to be noted that the exterior portion of the elastomeric material extends beyond the metal convolutes, beyond the elastomeric material on the connector 42 and over the braid mounted on the ring 44.

The device of the invention provides a superior sound attenuator for in-fluid-line noises, and simultaneously dampens vibrations caused by the pulsation and movement of fluid in the system. Since the metal convolutes provide metal contact with the fluids in the system, it may be used for hot or cold fluids with equal effect, depending upon the elastomeric material placed on the exterior. Due to the construction, the overall cost is low and competitive with currently used devices which are of a substantially lower life expectancy. Of considerable importance is the fact that the outer coating of elastomeric material, being relatively thick, not only protects the convolutes from abrasions and dents, which could otherwise become a locus for stress, it adds strength to the unit by being integrally attached to the material in the convolutes and attached to the end connectors. As such, the device may readily replace connectors which require guides or stress rings conventionally used. The flexibility of the unit provides a device that is essentially self-aligning. The unit may be readily used to contain pipe line motions on an axial plane because the elastomeric material, bonded with the metal convolutes, permits stretching, and then combined forces of the metal and elastomeric material cause return when the piping system stretch decreases. Normally, the lengthening and shortening is accomplished with only minor changes in the overall diameter of the unit.

In one form, a connector, made according to the invention, will provide an overall length of seven inches for a half-inch pipe size, providing a three inch live length, or length of bellows. This pipe has substantially a combined expansion of ⅜ of a inch axially of the unit and with a off-set of one-half inch to each side of the axis. For one-inch pipe size, the overall length is 9 inches, and a live length of 5 inches, providing a expansion of a half-inch and a maximum off-set to each side of at least a half-inch. Different sizes of course, will provide different dimensions but in the same general area.

What is claimed is:

1. An improved high pressure flexible, metal tube effective for internal and external high pressure, comprising:
   (a) A liquid impervious metal, convoluted, flexible circular tube, constructed and arranged to withstand high pressure fluid therein, and presenting a continuous and unbroken exterior surface.
   (b) End connectors integrally attached in liquid tight relation to the ends of said metal convoluted tube, including a straight heavier wall pipe section adjacent to each end of said convoluted tube and extending outwardly with a generally smooth tubular exterior surface at least about the distance equivalent to the distance of three convolutes.
   (c) an integral body of soft, flexible non-porous elastomeric material completely filling the exterior space between the convolutes of the convoluted tube and sealed and bonded to substantially the complete exterior surface of said circular tube, said integral body of soft, flexible elastomeric material extending radially outwardly a substantial distance beyond the outer diameter of the convolutes to provide a relatively thick scuff coating over the metal convoluted tube, and
   (d) said integral body of soft, flexible elastomeric material further including end portions extending axially in both directions from said convoluted tube along said pipe sections for a distance of from 2–10 convolutes, said end portions of said body of elastomer material circumferentially enclosing said pipe sections, having a thickness approximately equal to said scuff coat over said convolutes, and being securely bonded to said pipe sections over the complete exterior surface thereof engaged by said end portions, whereby said integral body of elastomeric material permits flexing of the convoluted tube while distributing the produced stresses over the entire area of the convolutes and into said pipe sections.

2. An improved flexible, metal tube according to claim 1, wherein:
   said material extends along said pipe sections a distance equal to the distance of 3 convolutes.

3. An improved flexible, metal tube according to claim 1, wherein:
   said material is a silicone rubber.

4. An improved flexible, metal tube according to claim 1, wherein:
   said end connectors include flange means, and said elastomeric material is additionally secured to said flange means.

5. An improved flexible, metal tube according to claim 1, wherein:
   additional strengthening means is embedded in said elastomeric material.

6. An improved flexible, metal tube according to claim 5, wherein:
   said strengthening means is an expandable wire mesh covering.

7. An improved flexible, metal tube according to claim 6, wherein:
   said wire mesh covering is secured to each said end connectors.

* * * * *